Jan. 28, 1936.  F. WOODS  2,028,856
RADIO DIRECTION FINDER
Filed April 8, 1931
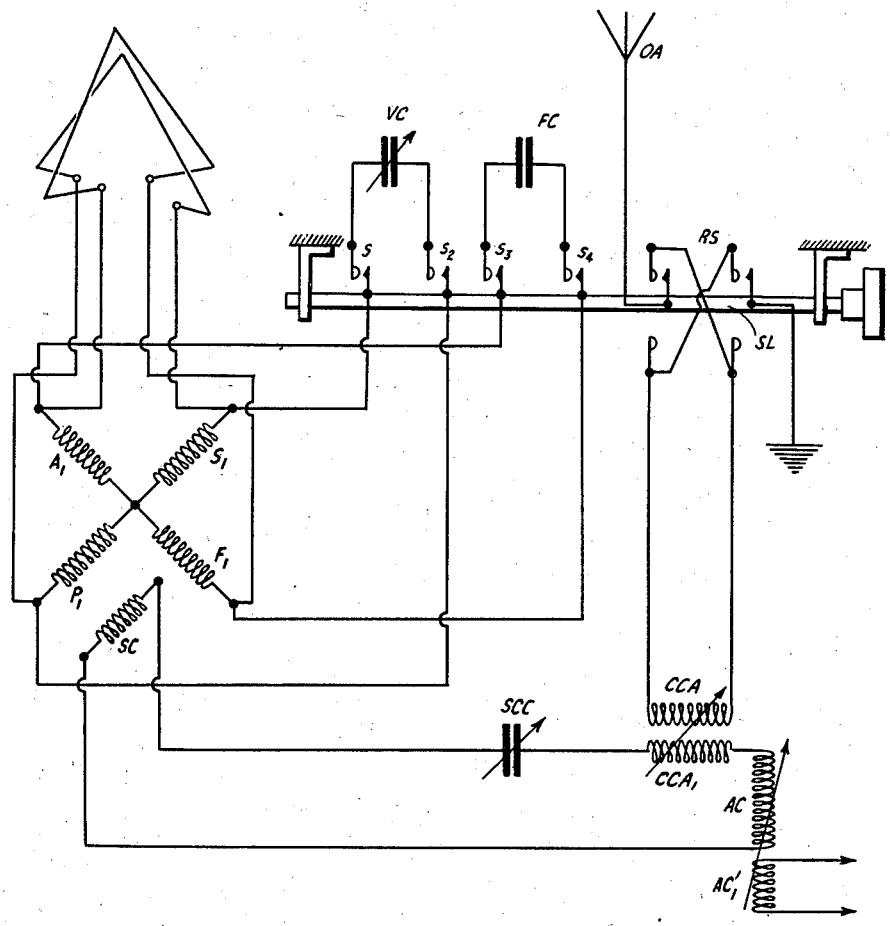
INVENTOR
FRED WOODS
BY 
ATTORNEY Patented Jan. 28, 1936

2,028,856

UNITED STATES PATENT OFFICE 2,028,856

RADIO DIRECTION FINDER

Fred Woods, Richmond, England, assignor to Radio Corporation of America, a corporation of Delaware Application April 8, 1931, Serial No. 528,472
In Great Britain April 8, 1930

4 Claims. (Cl. 250—11)

This invention relates to radio direction finding apparatus, and more particularly to so-called Bellini-Tosi direction finders, i. e. direction finders in which the receiving aerial system comprises two fixed frames at right angles to one another.

With untuned fixed loop direction finders employing the Bellini-Tosi principle it frequently happens, particularly in the case of ship board installations that the two fixed frames comprised in the aerial system must be made of different natural frequencies with respect to one another. In such cases, of course, one fixed frame circuit will be more nearly in tune with a given received wave than the other, and, if the natural frequency of either fixed frame circuit approximates to that of the received wave, more or less large errors in bearing will result owing to the fact that the relationship between volts and current in one fixed frame circuit will not be the same as that in the other so that the current set up in each fixed frame circuit will no longer be entirely dependent upon the angle at which the received wave front arrives but will be dependent also upon how nearly the circuit in question is in tune with the said received wave. In any case it is not desirable that the ratio of the natural wave length of a fixed frame to that of a received wave shall be closer than the ratio 4:5 or its reciprocal.

These circumstances seriously limit the usefulness and satisfactory operation of Bellini-Tosi direction finders because, when the wave length range to be received is considerable, e. g. from 185 to 1000 meters, it is not practicable so to arrange matters that there is no fixed frame resonance anywhere within the tuning range.

The present invention has for its principal object to overcome these difficulties and to provide a direction finding apparatus which may be employed over a wide range of frequencies without large errors due to fixed frame resonance.

According to this invention, a radio direction finder employing the Bellini-Tosi principle is designed to operate over a plurality of wave length ranges and artificial loading reactances are employed in conjunction with the fixed frame circuits in such a manner that when the apparatus is being employed upon any one of the working wave length ranges, fixed frame resonance occurs at a frequency nominally included within another tuning frequency range. In this way the directional efficiency of the system is made continuous throughout its whole range.

Preferably the artificial loading reactances are controlled by switch gear arranged to be actuated simultaneously with other switch gear provided for effecting the change over from one wave length range to another.

The invention is illustrated in the accompanying drawing which shows diagrammatically one arrangement in accordance therewith.

Referring to the drawing, a direction finding installation comprises a pair of mutually perpendicularly fixed frames across each of which is connected one of a pair of mutually perpendicular goniometer field coils $F_1A_1$ $P_1S_1$ which are associated with a search coil SC in the usual way. Across one field coil is connected through suitable switch contacts $SS_2$ a variable calibration condenser VC, while across the other field coil is connected (also through suitable switch contacts $S_3S_4$) a fixed condenser FC. An open aerial OA is provided for obtaining sense readings in the usual way, said open aerial being connected through a reversing switch RS with a coupling coil CCA which is variably coupled to a second coil $CCA_1$. The second coil is connected in series with a search coil tuning condenser SCC, the search coil SC and a further coupling coil AC which is variably coupled to a coil $AC_1$ in the input circuit of an amplifier (not shown). The switches associated with the variable calibration condenser and the fixed condenser and the reversing switch in the open aerial circuit are arranged to be uni-controlled by a shaft or lever SL (preferably earthed) which also operates suitable switch gear (not shown) for changing over the amplifier from one wave range to another. In the example now described, it is presumed that there are two wave length ranges and the arrangement is such that when the direction finder is operating for one wave length range fixed frame resonance occurs within the other tuning range.

It will be noticed that when working on one range, fixed frame resonance will occur above that of the received wave whilst when working on the other range it will occur below that of the received wave. This will, of course, result in reversing the cardioid diagram upon changing the wave length range. It is to avoid this that the reversing switch in the open aerial circuit is provided. The reversing switch may be replaced by any other phase reversing method or by making the search coil circuit or an intermediate circuit aperiodic on one of the ranges, e. g. by providing a switch for short-circuiting the search coil tuning condenser on one range. It will further be noted that since extra capacities are included in the aerial circuit on one of the ranges, the respective balance between the fixed frames (e. g. in the case of shipboard receivers, between the fore and aft and athwartships fixed frames) would be interfered with and calibration would accordingly be affected. It is for this reason that one of the loading condensers is made variable and the other fixed. This arrangement enables the calibration to be adjusted in the ordinary way for one wave range while on the other range the variable capacity may be utilized to provide adjustment so that the calibration for both ranges is substantially identical.

Having thus described my invention and the operation thereof, what I claim is:

1. A direction finding installation comprising a pair of mutually perpendicular fixed frames, a radio goniometer having mutually perpendicular fixed coils associated each with one of said fixed frames, a search coil connected in a circuit including a tuning condenser, a variable condenser, a fixed condenser, switching means for simultaneously connecting said two last mentioned condensers each in shunt with one of the fixed frames, an open aerial, a reversing switch connecting said open aerial in one or other sense with the search coil circuit, and means operable in common for actuating together the condenser switches and the reversing switch for effecting the change over from one wave length range to the other.

2. A radio direction finder system designed to operate over a plurality of wave length ranges, comprising a switch having a plurality of contacts arranged on a common shaft, means for simultaneously opening and closing said contacts, a pair of crossed loop aerials each normally detuned with respect to the frequency to be received, a variable condenser arranged with said contacts to be switched in parallel across one of said loops by said switch, a fixed condenser arranged with said contacts to be switched in parallel across the other loop by said switch, and an open aerial having contact means on the common shaft of said switch to simultaneously shift the phase of said circuit to transfer the natural frequency of the loop aerials to a wave length range not in use.

3. A directional radio energy absorption system to operate over two different frequency ranges to be used on marine vessels, comprising a plurality of crossed loop aerials normally tuned to a different frequency than the frequency to be received, but balanced with respect to adjacent ship structure, a vertical aerial, an inductance coil, switching means carried by a common shaft for reversing the directional flow of radio energy collected by said vertical aerial through said inductance, a fixed condenser and a variable condenser, and switching means on said common shaft for simultaneously connecting said variable condenser in parallel with one of said loops and said fixed condenser in parallel with another of said loops to transfer the natural frequency of the crossed loop aerials to the frequency range not in use.

4. A radio direction finder system comprising a pair of crossed loop antennæ each normally detuned with respect to the frequency to be received, an impedance network so connected to said loop antennæ as to utilize the energy collected thereon, a utilization circuit coupled to said impedance network, an omni-directional antenna having an impedance connection to ground, said impedance connection being coupled to said utilization circuit, means including a plurality of capacitors each connectible across different terminals of said loop antennæ and in shunt with different portions of said impedance network for varying the resonant frequency of said network and of said antennæ, and means including a switch for at times connecting said capacitors in the aforesaid manner while applying the energy of said omni-directional antenna to said utilization circuit in one phase relationship, and for at times open-circuiting said capacitors while reversing the phase relationship of the energy applied to said utilization circuit from said omni-directional antenna.

FRED WOODS.